United States Patent

[11] 3,594,865

[72] Inventor George H. Erb
 Cuttingsville, Vt.
[21] Appl. No. 840,779
[22] Filed July 10, 1969
[45] Patented July 27, 1971
[73] Assignee American Velcro Inc.
 Manchester, N.H.

[54] APPARATUS FOR MOLDING PLASTIC SHAPES IN MOLDING RECESSES FORMED IN MOVING ENDLESS WIRE DIES
 11 Claims, 19 Drawing Figs.
[52] U.S. Cl................................................. 18/5,
 18/21
[51] Int. Cl..................................................... B29c 3/02
[50] Field of Search........................................... 18/5 A, 5
 BE, 5 BH, 5 M, 5 BZ, 12 TB, 12 TF, 12 TM, 21, 1
 Z

[56] References Cited
 UNITED STATES PATENTS
3,196,490 7/1965 Erb................................. 18/21
3,372,080 3/1968 Billarant........................ 18/5 X Primary Examiner—Travis S. McGehee
Attorney—James D. Bock ABSTRACT: Apparatus for continuously forming a flexible web with molded pilelike protuberances of plastic material integral with plastic material incorporated in the base web. Protuberances may have almost any shape but as disclosed they are in the form of hooks, whereby the product is useful as the hook part of a flexible hook and loop fastening element such as the well known "Velcro" fastener. The base of the web is either a porous woven or nonwoven fabric or an extruded film, the fabric being impregnated with or the film being formed from molten plastic simultaneously with molding of the hooks. Dies for forming the hooks are separate continuous loops of wire having a cross-sectional contour and hook-molding recesses such that the wires form hooks in rows extending lengthwise of the base sheet. The width of the final product is established by the number and spacing of the wire dies. The wires are passed through lips of an extruder having openings conforming snugly to the cross-sectional contour of each wire. The openings strip the plastic material from the surfaces of the wires, leaving hook-shaped deposits of plastic in the molding recesses of the wires which are attached to the base sheet and, when cool are stripped from the wires.

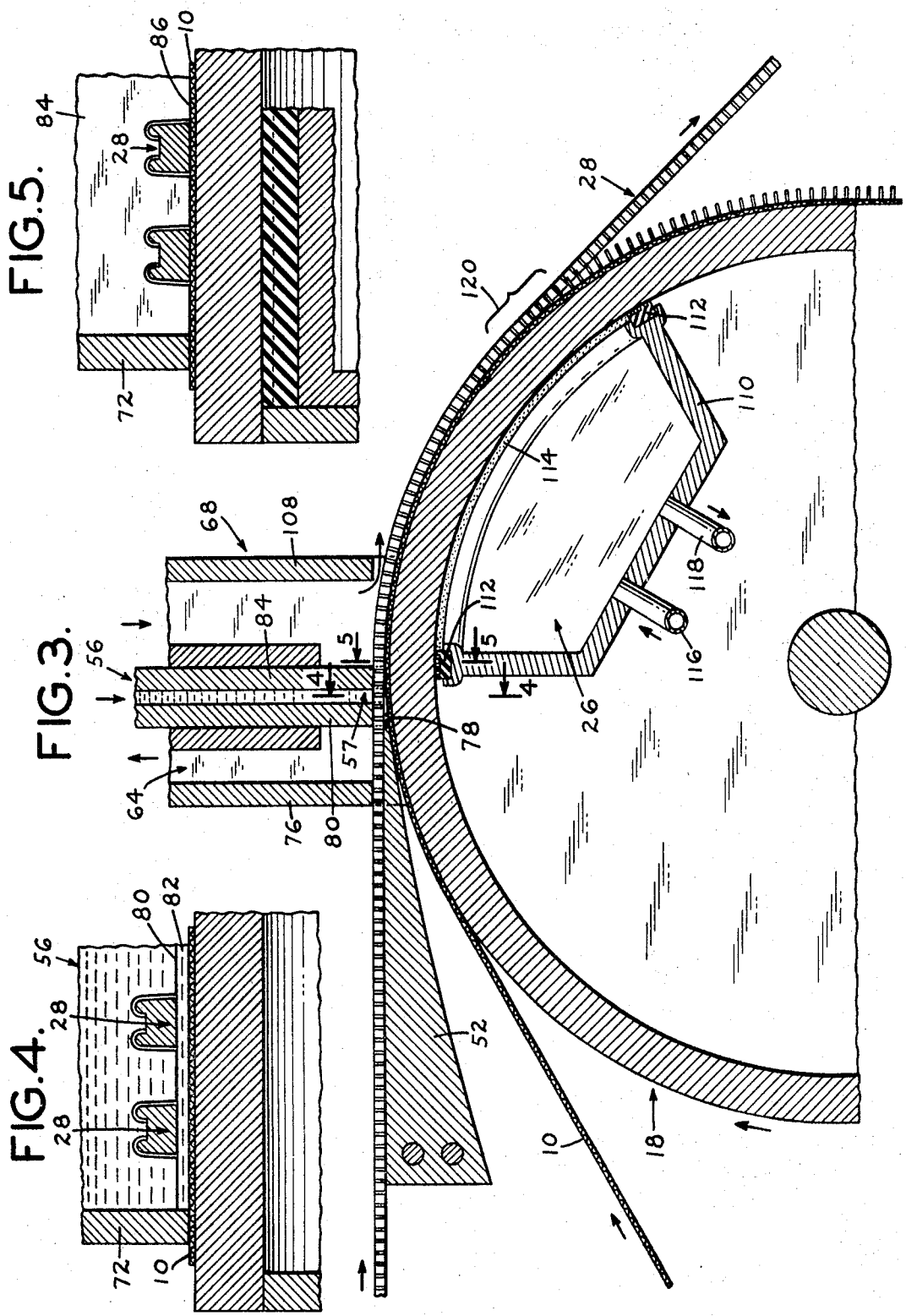

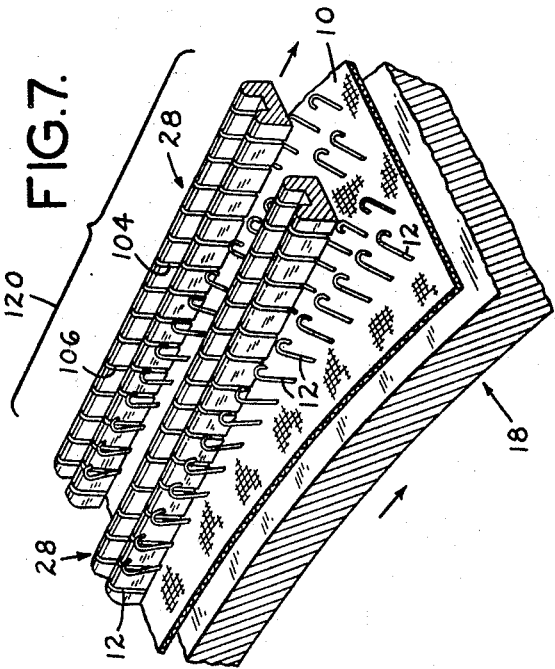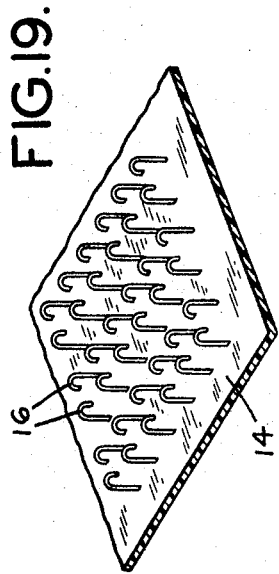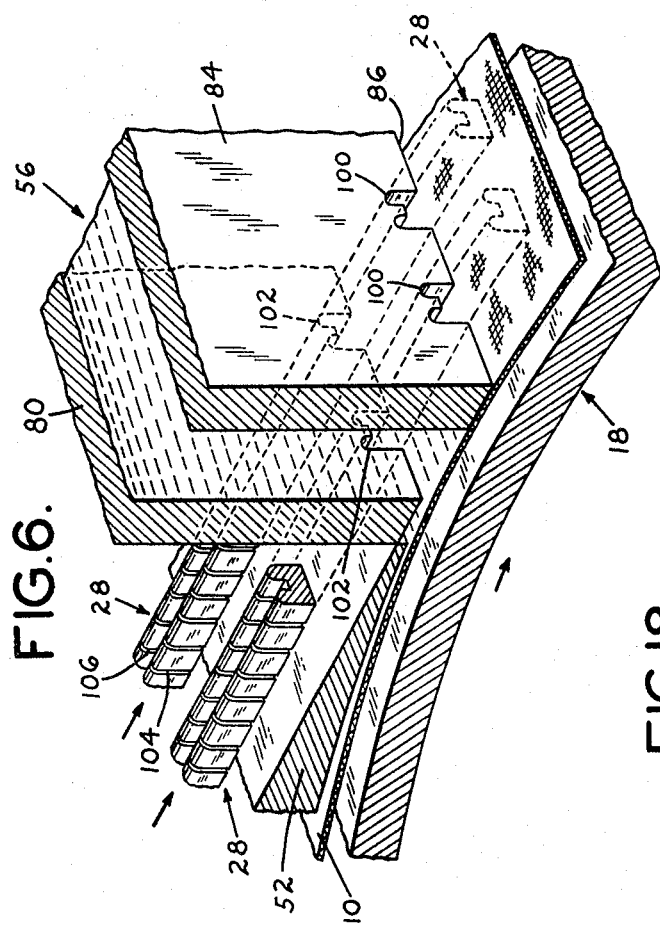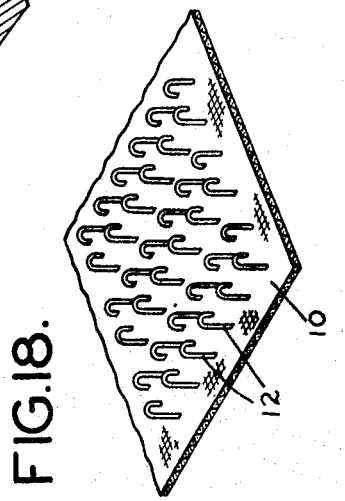

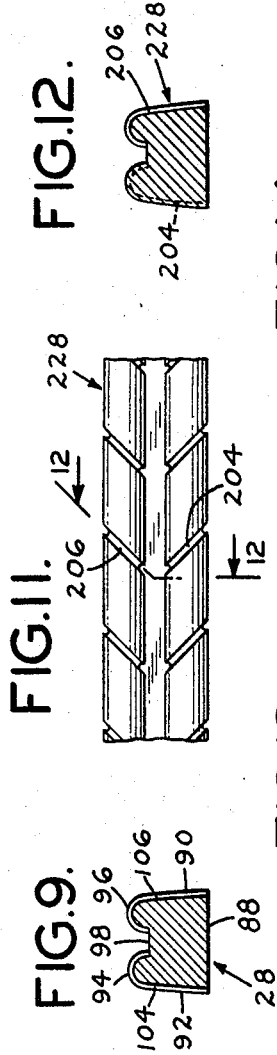
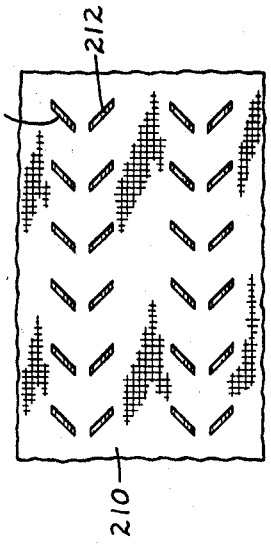
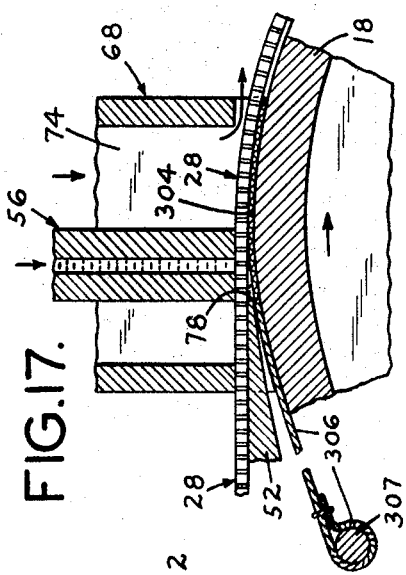

3,594,865

APPARATUS FOR MOLDING PLASTIC SHAPES IN MOLDING RECESSES FORMED IN MOVING ENDLESS WIRE DIES

BACKGROUND OF THE INVENTION

Flexible separable fasteners of the type sold under the trademark "Velcro" have been manufactured in accordance with U.S. Pat. Nos. 2,717,437 and 3,009,235 to De Mestral by weaving endless fabric ribbons with special warps to form loops or hooks. When hooks are made they customarily are made from special warps of nylon monofilaments which are first woven in the form of upstanding loop pile elements which are thereafter heat-set in looped conformation after which one leg of each loop is cut to leave an open-ended hook available to act as a fastening element. In U.S. Pat. No. 3,196,490 to Erb a machine is disclosed for continuous molding of fastening elements similar to the well-known "Velcro" fasteners by the use of a series of relatively moving die plates which are pressed into a compact group to form hook-molding recesses. Molten plastic is forced into the recesses and, after solidification of the molded hooks, the die plates are individually separated to permit withdrawal of the hooks from the die plates.

BRIEF DESCRIPTION OF THE INVENTION

The present invention, like U.S. Pat. No. 3,196,490, provides rapid and continuous production by injection molding techniques which are capable of production rates which are faster than the weaving techniques required in U.S. Pat. Nos. 2,717,437 and 3,009,235. The present invention however affords hook-molding dies which are much simpler to manipulate than the separate die plates of U.S. Pat. No. 3,196,490. In the present invention a plurality of endless loops of wire, each wire having a particular cross-sectional configuration and having a large number of hook-molding recesses formed therein is conducted in a spaced array through an injection zone including the nozzle of an extruding device for a molten plastic material. In the injection zone the die wires are conducted tangentially toward the surface of a continuously rotating metal drum and the wires are driven at the same linear speed as that of the surface of the metal drum.

For manufacture of one type of product a porous woven or nonwoven fabric is conducted in the form of a continuous web through a path lying between the wires and the surface of the drum. Just before the wires come into contact with the base fabric a liquid moldable plastic material, for example a molten plastic, is injected into the hook-molding recesses of the wires and also onto the surface and into the interstices of the base fabric which lies on the surface of the drum. The wires are then brought into intimate contact with the upper surface of the impregnated web so that the hooks become integral with the plastic material in the web. The web and wires are carried out of the injection zone through openings which provide a snug sliding fit for each wire. The openings strip the molten plastic material from the surfaces of each wire leaving the molten plastic material only in the hook-molding recesses. The emerging product is then cooled to solidify the hooks and impregnated web after which the die wires are stripped from the molded hooks.

For manufacture of another type of product no porous base sheet is used. Instead, the same molten plastic material which forms the hooks is extruded onto the surface of the drum in the injection zone to form, simultaneously with the formation of the hooks, a plastic backing film which is integral with the hooks.

BRIEF DESCRIPTION OF THE DRAWINGS

FIG. 3 is an enlarged vertical sectional view showing the injection zone of the machine illustrated in FIG. 1;

FIG. 4 is a vertical sectional view taken along the line 4–4 in FIG. 3;

FIG. 5 is a vertical sectional view taken along the line 5–5 in FIG. 3;

FIG. 6 is a greatly enlarged perspective view showing a portion of the injection zone of the machine and showing the relationship between the nozzle and the dies at the time of formation of the product;

FIG. 7 is a view similar to FIG. 6 but showing another zone in the machine in which the die wires are stripped from the finished product;

FIG. 8 is an enlarged fragmentary plan view of one form of die wire used in the present invention;

FIG. 9 is a vertical section taken along the line 9–9 in FIG. 8;

FIG. 10 is an enlarged fragmentary plan view of the hook pile fabric produced by the use of the die wire shown in FIG. 8;

FIG. 11 is a view similar to FIG. 8 but showing a modified form of die wire;

FIG. 12 is a vertical section taken along the line 12–12 in FIG. 11;

FIG. 13 is a view similar to FIG. 10 but showing the product resulting from the use of the modified die wire shown in FIGS. 11 and 12;

FIG. 14 is a view similar to FIG. 13 showing the product produced by still a further modification of the die wire;

FIG. 15 is a fragmentary end elevational view, with parts in section, showing a modified manner of use of the machine illustrated in FIG. 1;

FIG. 16 is a vertical sectional view taken along the line 16–16 in FIG. 15;

FIG. 17 is a vertical sectional view of the portion of the machine shown in elevation in FIG. 15;

FIG. 18 is a fragmentary isometric view of a product made by the machine illustrated herein; and FIG. 19 is a view similar to FIG. 18 but showing a modified form of product.

DESCRIPTION OF PREFERRED EMBODIMENTS

Figure 1:
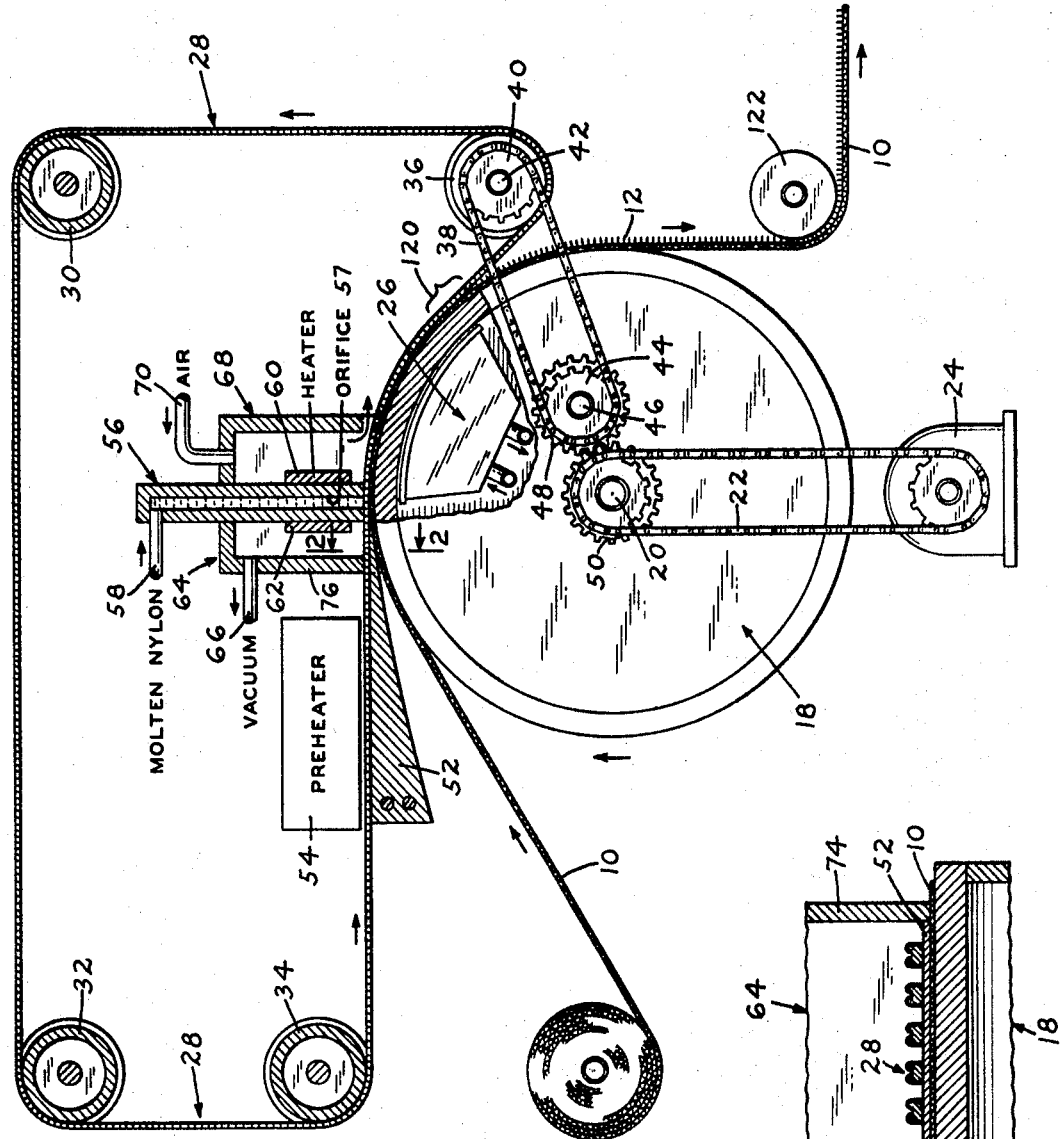
FIG. 1 is an end elevational view, with parts in section and parts broken away, showing the machine of the present invention in diagrammatic form with many parts being shown in disproportionately large size for clarity of illustration.

In FIG. 1 there is shown in somewhat diagrammatic form a machine for manufacturing hook pile products in accordance with the present invention. Referring briefly to FIGS. 18 and 19 there are shown two types of hook pile products which may be produced by use of the present invention. In FIG. 18 the product comprises a base sheet 10 made of flexible porous material such as woven or nonwoven fabric having distributed thereon a large number of hook pile elements 12. The hook pile elements are molded into hook form by the machine of the present invention from a suitable plastic material such as nylon. The base sheet 10 is impregnated with the same plastic material and the plastic material within the base sheet is integral with the hooks 12 at the foot of each hook. In FIG. 19 a base sheet 14 having a plurality of hooks 16 is shown. In this case the base sheet is a molded film and it as well as the hooks are molded by the machine of the present invention from a suitable plastic material such as nylon. Each of the hooks 16 is thus integrally joined at its foot with the base sheet 14. The products shown in FIGS. 18 and 19 are intended for use as the hook part of flexible fastening elements of the general type shown in the De Mestral U.S. Pat. Nos. 2,717,437 and 3,009,235 mentioned above. Thus it will be understood that the product is very small, that is, to simulate a commercial woven fastener the base sheet 10 or 14 may have a thickness of about 0.015 inch, the hooks 12 or 16 may have a cross-sectional dimension of about 0.008 inch and the hooks may stand about 0.06 inch in height. A relatively large number of hooks is provided on each square inch of surface of the product. For example there may be 16 hooks per inch in both directions thus making a total of about 256 hooks per square inch. The dimensions just given are approximate and subject to wide variations between fastener elements intended for different purposes. The present invention permits very wide deviations from usual dimensions and arrangements of the hooks and permits the use or formation of base sheets much thinner than is customary.

In FIG. 1 no attempt has been made to show the machine elements in proportionate size with respect to the product being made. Therefore the base sheet 10 which enters into the product of FIG. 18 is shown in FIG. 1 in grossly exaggerated thickness. Also the hooks 12 are shown in grossly exaggerated size.

Figure 2:
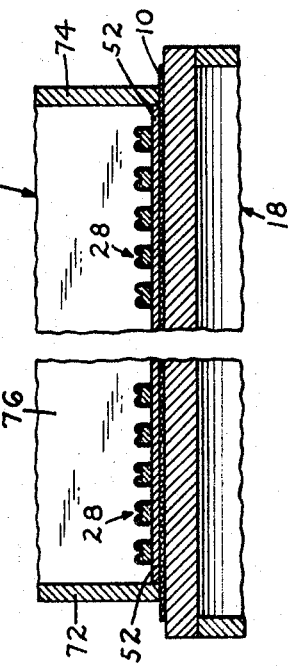
FIG. 2 is a vertical section taken along the line 2–2 in FIG. 1.

The machine of the present invention comprises a hollow drum 18 having a relatively smooth cylindrical surface preferably of metal such as stainless steel. The drum 18 has an axial length such as to make a sheet product of the present invention in any desired and practicable width. Thus as shown in FIG. 2 the drum 18 is broken away to indicate a substantially greater axial length than would appear only from a consideration of the size of the hook molding elements and thickness of the fabric 10. Referring back to FIG. 1 the drum 18 is supported upon a drive shaft 20 driven by a chain 22 which in turn is driven by a speed reducer or gear motor 24. The drum 18 has enclosed within it a cooling element 26 for chilling the cylindrical surface of the drum 18 at a point where solidification of the molded plastic product is desired.

The machine of the present invention is provided with a very large number of continuous wire dies 28 which are positioned in a parallel array (see FIGS. 1 and 2) and each of which is in the form of a closed loop of wire having specific cross-sectional contour and specific molding recesses as will be described below. These wires 28 are guided in a closed path about guide rolls 30, 32 and driving rolls 34 and 36 (see FIG. 1). The rolls just mentioned are each circumferentially grooved to provide a groove for each wire die 28. The drive roll 36 is driven by a chain 38 which passes around a sprocket 40 secured to the drive roll shaft 42. The drive roll 34 is driven by chain (not shown) directly connected with the roll 36. The chain 38 is driven by a sprocket 44 fixed to a shaft 46 which in turn has fixed to it a gear 48 driven by a gear 50 fixed to the main drive shaft 20 for the drum 18. The drum 18 turns in clockwise direction as viewed in FIG. 1 whereby, through the drive mechanism just described, the drive roll 36 for the wires 28 is driven in a counterclockwise direction. The ratios of the drive elements just described are so selected that the wires 28 move through their closed paths at exactly the same linear speed as that of the surface of the drum 18 and under little or no tension through the molding zone.

As the wires 28 approach the drum 18 from the left as viewed in FIG. 1 they are guided over a support plate 52 which tapers almost to a knife edge just short of the point of tangency of the wires 28 with the drum 18. In a position above the guide plate 52 there is located a preheater 54 for raising the temperature of the incoming wires 28 to a level appropriate for proper cooperation with a molten plastic material which is to be extruded onto these wires. Preheater 54, for example, may comprise an enclosed group of radiant heating elements (not shown) with proper reflectors to concentrate radiant heat upon the wires 28 as they pass across the guide table 52.

An extruder nozzle 56 extends downwardly and is yieldably pressed by means (not shown) radially toward the surface of the drum 18. The nozzle 56 has a narrow elongated slitlike orifice 57 which extends transversely across the machine. The nozzle 56 is connected through a pipe 58 with a suitable source of molten plastic material under such pressure, usually established by screw feeding mechanism, as is required to force the molten plastic through the nozzle 56 to the wires 28. Supplemental heating devices 60 and 62 may be provided adjacent the orifice of nozzle 56 in order to insure that the molten plastic within the nozzle will be at the required temperature just as it is ready to emerge from the orifice. It will be understood that the nozzle 56 and the wires 28, as shown in FIG. 1, are exaggerated in size and that the interior of the nozzle 56 will be only a few hundredths of an inch wide and that the thickness of the die wires 28 also will be only a few hundredths of an inch. The diameter of the drum 18 will be quite large as compared with the size of the product and can be selected in known manner to minimize curling of the final product incident to cooling shrinkage lengthwise of the plastic material selected for use. It will be advisable to crown the cylindrical surface of the drum to minimize transverse curling of the final product due to the cooling shrinkage characteristics of the particular plastic material selected for use. The specific diameter and amount of crowning of the drum 18 for use with a particular plastic material and for the production of a base sheet 10 of a particular thickness is empirical based upon the well-known principles utilized in production of cast plastic films.

As shown in FIG. 1 there is a vacuum chamber 64 positioned ahead of the nozzle 56. The chamber 64 is connected through a pipe 66 to a suitable vacuum pump (not shown). The purpose of the vacuum chamber 64 is to scavenge air contained within the recesses or occluded upon the surfaces of the die wires 28 just before the same enter under the nozzle 56. Also there is provided a cooling air chamber 68 located just beyond the nozzle 56. The chamber 68 is supplied with air under superatmospheric pressure through a pipe 70 from a suitable pump (not shown). The purpose of the chamber 68 is to supply cooling air directly upon the die wires 28 and the plastic material contained in the molding recesses thereof as will be further explained below. The cooling air preferably is arranged to exit from the chamber 68 in the direction of movement of the die wires 28 as indicated by the arrow appearing in FIG. 1.

Referring now to FIG. 2, which is a transverse section taken within the vacuum chamber 68 and looking upstream of the die wires 28, it will be observed that the vacuum chamber 64 comprises sidewalls 72 and 74 and an end wall 76. The sidewalls 72 and 74 also serve as sidewalls for the nozzle 56 and air chamber 68 and they have lower edges that conform with the curvature of the cylindrical surface of drum 18. These curved lower edges are arranged to bear directly upon the lateral edge portions of the fabric web 10 in the embodiment of the invention as shown in FIG. 2 whereby the fabric edges inhibit or reduce leaking of air or molten plastic along the lower edges of the walls 72 and 74. To this end the assembly of vacuum chamber 64, nozzle 56 and air chamber 68 is yieldably pressed downwardly to form a good seal while still permitting the fabric 10 to advance. The end wall 76 of chamber 64 extends transversely throughout the width of the machine and the lower edge thereof rests upon the upper surface of the guide plate 52 which preferably is sprung upwardly so as to yield downwardly with the nozzle assembly. The lower edge of the end wall 76 also has formed therein openings which are transversely contoured to form a snug sliding fit with the smooth surface portions of each of the die wires 28. This will be described in greater detail in connection with certain enlarged figures in the drawings but for the moment it will be sufficient to understand that as the die wires 28 move through the individual openings along the lower edge of end plate 76 only a relatively small amount of atmospheric air will be carried into the vacuum chamber 64 as a result of occlusion on the surface of the wires 28 and the presence of air in the molding recesses formed in the die wires 28. Thus it is possible to maintain a rather low gaseous pressure within the vacuum chamber 64 whereby such occluded and contained air will be effectively scavenged from the die wires 28 as they pass through the chamber 64 to afford good penetration of the molten plastic into depressions of the die wires 28.

Referring now to FIGS. 3 and 6 it will be observed that the guide plate 52 terminates in a very narrow vertical edge 78 which lies beneath the left-hand vertical surface of the upstream wall 80 of the extruder nozzle 56. The thickness of wall 80 is exaggerated in FIGS. 3 and 6 but it nevertheless has a finite thickness such as to establish a fabric wetting chamber therebeneath to insure that the incoming fabric 10 will be impregnated with the molten plastic material extruded from the nozzle 56 before the wires 28 come into contact with the surface of the fabric 10. This is shown in enlarged detail in FIG. 4 which is a section taken inside the nozzle 56 and looking upstream. In FIG. 4 it will be noted that the sidewall 72 continues to form a seal for the lateral sides of the nozzle 64. The lower edge of the end wall 80 of nozzle 56 terminates in substantially the same horizontal plane as the lower surfaces of the wires 28. The end wall 80 has formed along its lower edge a plurality of openings providing a snug sliding fit for each of the wires 28. Therefore the wires 28, the end wall 80 and the end 78 of table 52 combine to form a transversely extending chamber mentioned above and indicated by the reference numeral 82 in FIG. 4. It will be apparent therefore that the molten plastic material being extruded from nozzle 56 will flow freely into the chamber 82 and this will spread throughout the entire enclosed upper surface area of the fabric web 10. The fabric 10 thus will become wetted by and impregnated by the molten plastic material and as the web 10 and wires 28 progress to the right as viewed in FIG. 3 beneath the orifice 57 of nozzle 56 the lower surfaces of each of the wires will come into contact with the transversely coated and impregnated web 10.

Referring back to FIG. 3, the downstream wall 84 of the nozzle 56 has a finite width and is so located as to guide the wires 28 into firm contact with the upper surface of the plastic impregnated web 10. The enlarged detail view, FIG. 5, shows the downstream end wall 84 and also shows that the lower edge 86 thereof bears upon the upper surface of the web 10. The lower edge 86 of downstream wall 84 also has formed therein a plurality of openings each of which affords a snug sliding fit for one of the wires 28. The function of the downstream wall 84 will be apparent from FIG. 5 in that it will doctor molten plastic material from the upper surface of the web 10. The snug fitting openings through which the wires 28 pass when exiting from the downstream wall 84 will serve to doctor molten plastic material from the smooth surface portions of wires 28. However it will be appreciated that any molding recesses formed in the surfaces of wires 28 will continue to retain the molten plastic material which enters such recesses under the pressure of nozzle 56.

Up to this point specific description of the contour of, or of the molding recesses formed in, the individual die wires 28 has not been given inasmuch as such contour as well as the shape and disposition of such recesses will depend upon the specific product which it is desired to manufacture. As indicated above a primary purpose of the present invention is to form the hook-pile products shown in FIGS. 18 and 19. For the manufacture of such products die wires 28 having cross-sectional contour and molding recesses of the type shown in FIGS. 6 and 7 will be used. Also, particularly in FIG. 6, the shapes of the guide openings for such wires are shown in detail.

FIG. 6 is a broken perspective view with parts in section in which the upstream wall 80 and downstream wall 84 of the nozzle 56 are shown in greatly enlarged form. Thus the portions of two die wires 28 which are shown in full lines are in a position approaching the nozzle 56. The portions of such wires which are passing through the nozzle 56 are shown in broken lines so as to permit a full line showing of the walls 80 and 84 and the wire guide openings therein.

From a consideration of FIG. 6 as well as FIGS. 8 and 9, the preferred contour of a wire 28 may be clearly understood. REferring first to FIG. 9 it will be noted that the wire 28 has a flat bottom surface 88 and slightly inwardly sloping sidewalls 90 and 92 which continue upwardly and curve over high points 94 and 96 and thence downwardly to a horizontally disposed bottom wall 98 of a trough which extends throughout the length of the wire 28. All of the surfaces so far described are smooth and would be continuous except for the molding recesses sunk therein. Such smooth surfaces are the surfaces from which all of the molten plastic material will be scraped as the wires pass through the openings formed along the bottom edge 86 of the downstream nozzle wall 84 as shown in FIG. 6. Openings 100 formed in the downstream nozzle wall 84 conform precisely to the exterior contour of the wire 28 as viewed in FIG. 9. Openings 102 of identical contour are formed in upstream nozzle wall 82. (Also, the openings, not numbered, which are formed in wall 76 of vacuum chamber 64 are of this same contour.) The inwardly sloped walls 90 and 92 of wire 28 and the corresponding walls of openings 100 and 102 are provided to compensate for wear between the walls and wires.

For forming the hooks each of the wires 28 is provided with a plurality of recesses 104 and 106 which are spaced longitudinally of the length of the wire as shown in FIG. 8. These recesses are sunk into the sidewalls 90 and 92 of each wire and extend upwardly and over the high points 94 and 96 to terminate at the bottom wall 98 of the groove extending along the wire 28. As shown in FIG. 8 the recesses 104 and 106 are generally semicircular in cross section whereby the hooks formed in such recesses will have semicircular cross sections. This is not an absolute requirement and, as will be described below, it depends somewhat upon the manner in which the wires 28 are manufactured.

The particular contour of wires 28 with recesses 104 and 106 as shown in FIG. 8 will produce a product such as that shown in FIG. 18 and in greatly enlarged detail in FIG. 10. This product will comprise the base fabric 10 and hooks 12 standing almost vertically from and integrally molded with the upper surface plastic impregnated base fabric 10. Each wire 28 will form two rows of hooks 12 with the open ends of the hooks facing inwardly toward one another.

As the wires 28 progressively emerge from the openings 100 of the downstream wall 84 of nozzle 56, as shown in FIGS. 5 and 6, they enter the cooling air chamber 68 and finally emerge beneath the lower edge of the downstream wall 108 of cooling chamber 68 (see FIG. 3). The lower edge of wall 108 need not be provided with shaped openings but rather may be a plain straight edge as indicated in FIG. 3. The combined effect of the cooling air supplied to chamber 68 and the cooling device 26 located within the drum 18 is to cool and solidify the molten plastic material within the recesses 104 and 106 as well as the plastic material with which the fabric 10 is impregnated. The cooling device 26, as shown in FIG. 3, comprises a box 110 extending along the entire axial length of the drum 18. The box 110 preferably is provided with sealing gaskets 112 and 114 extending transversely and circumferentially respectively of the box whereby to confine a coolant material within the box. An appropriate coolant material such as a gas or liquid may be supplied to the box 110 through a pipe 116 and may be exhausted from the box through a pipe 118. It will be noted that the cooling device 26 is so located as to cool that portion of the drum 18 which immediately follows the extruder nozzle 56 and it extends circumferentially of the drum to a zone 120 at which the wires 28 are stripped from the finished product.

In FIG. 7 the stripping operation in the zone 120 is illustrated in a perspective view. It will be noted that the hooks 12 which are entering zone 120 from the left as viewed in FIG. 7 are still positioned within the recesses 104 and 106 in which they were formed. In zone 120 the wires 28 are guided tangentially away from the surface of the drum 18 and toward drive roll 36 (FIG. 1). The product comprising base 10 and hooks 12 continues to follow the surface of the drum 18 for a substantial distance beyond zone 120 to a guide roll 122 which guides the product away from the drum 18. Referring back to FIG. 7 it will be noted that in zone 120 the hooks 12 which are flexible and resilient are progressively cammed out of the recesses in which they were formed as the wires 28 are pulled away in a tangential path. As each row of hooks 12 is cleared by the corresponding wire 28 the hooks will spring back into their final positions. A primary advantage of the present invention is the simple stripping operation just described which because the hooks are molded in final form, obviates the need for heat-setting and cutting of closed loops in accordance with prior art procedures.

Modifications in the cross-sectional contour or dimensions of the wire dies or in the size or arrangement of the molding recesses therein may be made in order to produce hook pile products having specific characteristics which may be desired. For example, as shown in FIGS. 11 and 12, a wire 228 having the same cross-sectional configuration as any one of the wires 28 may be modified by forming molding recesses 204 and 206 therein which extend at acute angles with respect to the longitudinal axis of the wire 228 in order to form a double row of hooks with angularly disposed open ends. The pattern of hooks formed by a wire such as 228 is illustrated in FIG. 13 wherein the base fabric 210 carries a plurality of rows of hooks 212 the open ends of the hooks in each pair of rows facing inwardly toward one another at angles with respect to the length of the web product.

The product illustrated in FIG. 14 comprises a base 310 provided with alternating pairs of hooks 312 in each double row disposed at opposite angles throughout the length of each row. The wire die for making the product shown in FIG. 14 is not illustrated herein but it will be understood that it differs from that shown in FIGS. 11 and 12 only in that alternating pairs of molding recesses 204 and 206 are disposed at opposite angles instead of being parallel as shown in FIGS. 11 and 12.

In FIGS. 15, 16 and 17 there is disclosed a modification of the present invention wherein no porous fabric base, such as the base 10 disclosed in preceding figures, is used. Thus this modification is for the purpose of making the product shown in FIG. 19 in which the base sheet 14 of the final product is an extruded film of the same molded plastic material as is used for forming the molded hooks 16. To achieve this modification there is no structural alteration of the machine except the addition thereto of a gasket to fill the radial space normally occupied by fabric 10. Such gasket, as shown in FIGS. 15, 16 and 17, comprises an apron 306 anchored to a fixed rod 307. The apron 306 has a full width portion which extends beneath the support plate 52 and terminates just beyond the inner end 78 of plate 52 so as to seal the full width of the space extending radially of drum 18 to the lower surface of plate 52. The gasket also includes narrow extensions 302 and 304 which lie respectively, beneath the sidewalls 72 and 74 of the injection unit (see FIGS. 16 and 17).

The gasket 306, 302, 304 thus forms a chamber 382 which corresponds with the chamber 82 shown in FIG. 4 and which is sealed along both side edges as well as across the upstream edge. The molten plastic material extruded from the nozzle 56 will thus flow downwardly beneath the wires 28 to fill the chamber 382 and to continuously flow forwardly with the wires 28 beneath the orifice of nozzle 56. The cooled drum 18 will continuously absorb heat from the wires 28 and molten plastic and will result in the formation of solidified layer of plastic material which is cast upon the surface of drum 18. This layer carries additional plastic material forward to form a film of plastic material having approximately the thickness established by the thickness of the circumferentially extending gasket portions 302 and 304 and the doctoring action of the lower edge surface 86 of wall 84. The hooks 14 which are formed in the recesses 104 and 106 of each of the wires 28 will be integrally joined with the film thus formed and the wires 28 emerge with the film from the openings in wall 84 into the cooling chamber 68. The product manufactured in accordance with FIGS. 15, 16 and 17 then is subjected to the stripping operation in zone 120 as illustrated in FIG. 7 in exactly the same manner as the product herein before described.

For the manufacture of an all-plastic product as just described the wires 28 may have the configuration and molding recesses shown in FIGS. 8 and 9 or may comprise modified wires such as 228 shown in FIGS. 11 and 12.

The gasket 306, 302, 304 may be made of woven or nonwoven fabric or of suitable sheet plastic or elastomeric material as desired. When made in one piece as shown in FIGS. 15, 16 and 17 it is not necessary to secure the narrow strips 302, 304 to the sidewalls 72 and 74. The constant movement of drum 18 sliding beneath the gasket will tend to hold the strips 302, 304 in extended position and the downward pressure exerted by the extruder assembly will hold these strips in place against the very slight fluid pressure exerted for the extrusion of the molten plastic material. However, if the machine is to be used solely for manufacture of all-plastic products it may be preferred to use permanent gasket strips, corresponding with 302 and 304, secured to the lower curved edges of walls 72 and 74 and a permanent gasket strip secured across the inner end region of support plate 52. The one-piece gasket 306, 302, 304 shown herein, on the other hand, affords the advantage of ready interchangeability with similar gaskets of various thicknesses to permit the manufacture of final products having base sheets 14 (FIG. 19) of correspondingly different thicknesses.

A preferred plastic material for use in the present invention is nylon of any of the several types available at the present time. Different types will produce hooks of different degrees of stiffness, chemical resistance and the like. Also the nylon may have extenders or fillers added to impart special characteristics such as enhanced stiffness. Beyond this, however, plastic materials other than nylon may be used, for example, soft elastomeric materials such as vinyl or butyl compounds may be used to form hooks or knobs for the surfaces of hair curler rollers or other applications where light holding power is desirable.

The wire dies 28 or 228 may be extruded, drawn or rolled, as appropriate for the particular metal from which they are made, to establish the cross-sectional shape illustrated herein. If made of hardened or hardenable steel they can be given approximate oversize cross-sectional contour and thereafter ground to precise contour. The recesses 102, 104 may be formed by rolling or coining operations but preferably, particularly when ground hardened steel is used, they are sunk by spark etching as is customary in die-sinking practice.

The molding recesses 102, 104, as noted above, may be semicircular in cross section, partly because such a shape is relatively easy to form by any of the processes suggested above and further, because such shape favors clean stripping of the molded hooks. However, the resultant semicircular cross section of the molded hooks, although entirely satisfactory in use, affords no specific advantage and the molding recesses may be differently shaped to produce a hook cross section that may be preferred for some particular reason. For instance, greater hook stiffness or greater holding power in the final product might be achieved by shaping the hooks with substantially square or triangular cross section or with irregularly changing cross sections or with serrated edges. In selecting the cross-sectional shape it needs only to be borne in mind that the molded shapes must be capable of stripping from the recesses. Thus undercuts must be avoided and draft must be provided.

The openings in the walls through which the wire dies 28 pass (see openings 100 in wall 84 in FIG. 6, for example) may be milled, broached or ground in proper spacing and contour for good sliding fit with wires. Since the openings in all walls 76, 80 and 84 are the same depth, the blanks from which the walls are formed may be set up and machined simultaneously to form accurate lower edges and wire-receiving openings. When steel wires 28 or 228 are used the walls 76, 80 and 84 may be made of brass to afford good bearing characteristics with the wires.

It will be recognized that by selecting the materials for the wires 28 or 228 and the walls 76, 80, 84, wear due to friction between these parts may be substantially equalized or may be concentrated on one or the other as may be desired. In a particular machine it may be less troublesome and/or expensive to replace the walls 76, 80 and 84 while in another machine it may be preferable to replace the wire dies 28 or 228, and in either situation the wear may be concentrated on the more readily replaceable part.

The wires 28 and 228 illustrated herein are rather complicated in cross-sectional contour because they are designed to form double rows of molded hooks which are very similar in shape and disposition to the hooks formed by weaving and cutting of special pile warps in accordance with the De Mestral U.S. Pat. No. 3,009,235. If so desired the shape of the wires 28 or 228 may be simplified, for example by forming a separate wire for each row of hooks instead of providing a double row of hooks. Furthermore it may be preferred to make each wire semicircular in cross section with the hook-molding recesses extending through, say about 120° to 140° of the circumferentially curved upper surface of each wire. The flat bottom surfaces of such semicircular wires will correspond with the surfaces 88 of wires 28 (see FIG. 9). The hooks formed by such wires will be curved throughout their lengths and while the individual penetrating and holding ability of such hooks when used with the customary looped fastener element may be less than that of otherwise identical hooks of the shape shown in the drawings hereof, they nevertheless make it possible to provide a useful and extremely low-cost product for appropriate purposes. As will be apparent the openings 100 and 102 in the walls 76, 80 and 84 for use with wires of the simplified shapes just discussed will be correspondingly modified and in some instances, at least, may be formed more rapidly or at less cost than the openings 100, 102 illustrated in the drawings.

It will be appreciated that the present invention will find its greatest utility in the production of articles having pilelike or bristlelike protuberances which are difficult or impossible to mold in cavities sunk into a solid die such as a rigid metal plate. The hooks selected for illustration herein have the return-curved ends which would make the sinking of appropriate cavities impractical and furthermore they would be difficult to strip from such cavities. Other shapes such as piles or bristles with enlargements at the outer ends, i.e. shaped like mushrooms, would present similar difficulties but can be readily produced on wire dies in the combination disclosed herein. Also, very long, thin bristles which otherwise could be molded in straight die cavities sunk into a rigid plate, present a severe problem from the standpoint of obtaining uniform filling of such cavities with molten plastic material because of the entrapment of air in the cavities. The present invention makes it possible to sink very shallow semicircular cavities of great length into the vertical sides 90 or 92 (FIG. 9) of the wire dies 28 and such cavities can be readily filled with molten plastic material to form long straight bristles in the same manner that the vertical leg portions of the hooks 12 or 16, shown herein, are formed.

A particular advantage of the use of individual endless wire dies such as the dies 28 in FIG. 1 is that they may move laterally with respect to one another to accommodate variations in lateral spacing between the guide openings such as the openings 100 and 102 in FIG. 6. Thus the lateral spacing between the openings 100, for example, in plate 84 need not be held to extremely fine tolerance when the openings are formed in the plate. Furthermore changes in lateral spacing between guide openings inevitably will occur due to thermal expansion and contraction of the plates in which the openings are formed. For example the spacing between openings in any of the plates 76, 80 and 84 will be different when the machine is shut down and cool than it will when the machine is operating. Even while the machine is in operation the plate 76 may be somewhat cooler than the plates 80 and 84 which are in direct contact with molten nylon.

As mentioned above it is desirable that the wire dies 28 be under little or no longitudinal tension as they progress from driven guide roll 34 to driven guide roll 36. This is particularly desirable in connection with operation of the machine as illustrated in FIGS. 15 through 17 inasmuch as substantial tension on the wire dies 28 might cause the dies to squeeze the freshly extruded base film making it thinner than desired. If the wire dies 28 are made precisely equal in length they may be maintained under very little tension throughout the endless paths thereof in the apparatus as shown in FIG. 1, for example. Precision in length may be achieved by cutting all of the wire dies 28 as endless bands from a metal tube having a circumference equal to the desired wire die length.

If the wire dies 28 are fabricated by joining the ends of lengths of wire they may not be precisely equal in final length. Small variations in lengths of the endless wire dies 28 may be accommodated by using a grooved rubber or other yieldable material as a jacket for one or more of the guide or drive rolls 30, 33, 34 and 36. The resultant variations in tension between the individual wire dies 28 will cause no difficulty if the variations in lengths of the wires is fairly small. For greater variations in length which might be encountered the tensions may be made uniform by equipping each endless wire die 28 with a tension regulator (not shown) for example individual weights such as are used in regulating the tensions on individual ends in the warp sheet of a conventional weaving loom.

In any instance wherein the regulation of tension on the individual wire dies 28 results in undesirably high tension within the extruding zone, that is between rolls 34 and 36, the driving effect of rolls 34 and 36 may be converted to a positive rather than the frictional type disclosed herein. For example, positively driven pressure nip rolls (not shown) may be added to press radially against all of the wires at some point of the wrap thereof around both of the driven rolls 34 and 36. In this or other well known manner the tension on the wire dies 28 may be preset and maintained at desired level through the extruding zone.

As mentioned above it may be preferable to crown the drum 18 to compensate for the possibly unequal shrinkage upon cooling of the plastic on the upper and lower surfaces respectively of the base sheet. In such event the lower edges of the nozzle walls 80 and 84 should be correspondingly concave instead of being flat as shown herein. In either event the portions of such lower edges will form substantially smooth continuations of the generally planar bottom surfaces 88 of the die wires 28 when assembled therewith as shown, for example in FIG. 5. Also, the upper and lower surfaces of the support plate 52 should be convex and concave respectively to correspond with the crowning of the drum 18 when it is so crowned.

The words "substantially smooth continuations" as used hereinabove and in the claims are intended to include the relation between the bottom surfaces of die wires 28 and the lower edges of walls 80 and 84 which may exist before and after tolerable wear of the wires 28 or the openings 100 or 102 (see Fig. 6). Thus the bottom surfaces of wires 28 may protrude somewhat below the lower edges of walls 80 and 84 in a new installation and may recede somewhat above such edges after wear.

For convenience in describing and claiming the present invention certain parts have been described in terms of the orientation thereof shown in the drawings. For example the top, bottom and side surface portions of the die wires 28 have been so described and the surface of the movable support or drum 18 has been described as below the wire dies 28 and nozzle 56. It will be understood that the apparatus of the present invention may be oriented at any desired angle in space inasmuch as gravitational forces play no essential part in the operation of the apparatus.

While the plastic extruding nozzle 56 has been shown in the drawings as extending entirely across all of the die wires in the machine as has the extruding outlet beneath the wires 28 and lip 86 of wall 84 (see FIG. 5) it will be apparent that two or more nozzles and extruding outlets may be employed to cover the full width of a machine. Also a single nozzle or extruding outlet may be subdivided into separate lateral chambers if so desired. In such cases each separate nozzle or subdivision would extend entirely across a group of two or more wires and each such group would constitute a spaced array of die wires as defined in the claims.

What I claim is:

1. In a machine for making plastic shapes from a moldable plastic material the combination of a plurality of individual die wires each comprising an endless loop of metal wire having a predetermined cross-sectional contour defining the exterior surface of said die wire, the surfaces of said die wires having a plurality of open molding recesses sunk therein and spaced along the lengths of the die wires in which they are sunk; means for driving all of said die wires lengthwise through endless paths; means for guiding all of said die wires into a portion of said paths wherein said die wires lie in spaced array; an extruder nozzle extending transversely of said portion of the paths of said die wires, said nozzle having a transversely extending upstream wall which is upstream of said nozzle relative to the paths of movement of said die wires in said spaced array, and a transversely extending downstream wall; said upstream wall having a plurality of spaced upstream openings equal in number to the number of said plurality of die wires; each of said upstream openings extending through said upstream wall in the direction of travel of said die wires to permit the passage of one of said die wires through said upstream wall to enter and move through said nozzle, each of said upstream openings having a contour such as to conform with an accurate sliding fit to portions at least of the surface of the die wire passing therethrough; said downstream wall having a plurality of spaced downstream openings equal in number to the number of said plurality of die wires, each of said downstream openings extending through said downstream wall in the direction of travel of said die wires to permit the passage of one of said die wires through said downstream wall to leave said nozzle, each of said downstream openings having a contour such as to conform with an accurate sliding fit to portions at least of the surface of the die wire passing therethrough; means for supplying a liquid moldable plastic material under pressure to the interior of said nozzle whereby to deposit said plastic material upon said die wires and in the molding recesses sunk therein as they pass through said nozzle; said upstream openings in said upstream wall preventing upstream leakage of said liquid plastic material along the surfaces of said die wires, said downstream openings in said downstream wall being effective as said die wires pass therethrough to remove plastic material progressively only from those portions of the surfaces of said die wires to which said downstream openings conform; and means downstream of said nozzle for solidifying the liquid moldable plastic material remaining in said molding recesses.

2. A machine in accordance with claim 1 in which there is provided a suction chamber upstream of said extruder nozzle for reducing the amount of air occluded upon all of said die wires and included in the molding recesses sunk in said die wires as said die wires enter said upstream openings in said upstream wall of said nozzle.

3. In a machine for making plastic shapes from a moldable plastic material the combination of a plurality of individual die wires each comprising an endless loop of metal wire having a predetermined cross-sectional contour defining the exterior surfaces of said die wire including side and top surface portions and a generally planar bottom surface, some of the said surface portions at least of said die wires having a plurality of open molding recesses sunk therein and spaced along the length of the surface portions of said die wires in which they are sunk; means for driving all of said die wires at a predetermined linear speed lengthwise through endless paths; means for guiding all of said die wires into a portion of said paths wherein said die wires lie in spaced array; stationary supporting means engaging all of the bottom surfaces of said die wires in said portion of said paths to support said die wires against downward movement; an extruder nozzle having a narrow slitlike orifice extending transversely of said portion of the paths of said die wires entirely across the width of said spaced array of die wires, said orifice being defined by a transversely extending upstream wall defining the edge of said orifice which is upstream thereof relative to the paths of movement of said die wires in said spaced array, a transversely extending downstream wall and spaced sidewalls defining the ends of said orifice; said upstream wall having a lower edge in which there is formed a plurality of spaced notchlike upstream openings equal in number to the number of said plurality of die wires, each of said upstream openings extending through said upstream wall in the direction of travel of said die wires to permit the passage of one of said die wires therethrough to enter and move through said orifice, each of said upstream openings having a contour such as to conform with an accurate sliding fit to said side and top surface portions of the die wire passing therethrough; said downstream wall having a lower edge in which there is formed a plurality of spaced notchlike downstream openings equal in number to the number of said plurality of die wires, each of said downstream openings extending through said downstream wall in the direction of travel of said die wires to permit the passage of one of said die wires therethrough to leave said orifice, each of said downstream opening having a contour such as to conform with an accurate sliding fit to said side and top surface portions of the die wire passing therethrough; the portions of the lower edge of each of said upstream and downstream walls which lie between the spaced notchlike openings formed therein constituting substantially smooth continuations of the generally planar lower surfaces of all of the die wires passing respectively through said upstream and downstream walls when said extruder nozzle is pressed downwardly upon said die wires in said portion of said paths; means for supplying a liquid moldable plastic material under pressure to the interior of said nozzle whereby to deposit said plastic material upon the portions of all of said die wires which are passing through said orifice and in the molding recesses sunk in said portions of said die wires; said upstream openings in said upstream wall of said nozzle preventing upstream leakage of said liquid plastic material along said side and top surface portions of said die wires, said downstream openings in said downstream wall of said nozzle being effective to remove plastic material progressively from the side and top surface portions only of said die wires as they pass through said downstream wall; and means downstream of said extruder nozzle for solidifying the liquid moldable plastic material remaining in said molding recesses.

4. A machine in accordance with claim 3 in which there is provided a movable support means having a surface spaced below the level of the bottom surfaces of all of those portions of said die wires which are passing through said orifice; means for driving said movable support means to move said surface at a speed which is equal to the predetermined linear speed of said die wires; said stationary supporting means having a generally vertically disposed downstream end wall extending transversely throughout the width of and located beneath said upstream wall of said nozzle; sealing means between said surface of said movable support means and said vertically disposed end wall of said stationary supporting means thereby to provide a chamber positioned below said bottom surfaces of said die wires, above said surface of said movable support means and downstream of said end wall of said stationary supporting means, into which chamber said liquid plastic material will flow from said orifice downwardly through the spaces between said die wires which are passing through said orifice, and from which chamber said liquid plastic material is prevented by said sealing means from leaking in an upstream direction; said chamber having an extruding outlet defined at the top by the bottom surfaces of the portions of all of said die wires which are passing through said downstream wall of said nozzle and the continuations of said bottom surfaces afforded by said portions of said lower edge of said downstream wall which lie between said spaced array of die wires, and said extruding outlet being defined at the bottom by said surface of said movable support means, said extruding outlet extending transversely throughout the width of said spaced array of die wires and being closed at the transverse ends whereby said liquid plastic material is free to flow only downstream from said extruding outlet.

5. A machine in accordance with claim 4 in which there is provided a suction chamber upstream of said extruder nozzle for reducing the amount of air occluded upon all of said die wires and included in the molding recesses sunk in said die wires as said die wires enter said upstream openings in said upstream wall of said nozzle.

6. In a machine for manufacturing a continuous web comprising a flexible base sheet made at least in part from a moldable plastic material and having pilelike protuberances made from and integral with the plastic material of said base sheet, the combination of a plurality of die wires each comprising an endless loop of metal wire having a predetermined cross-sectional contour defining exterior surfaces of said die wire including side and top surface portions and a generally planar bottom surface, at least some of the side surface portions of said die wires having a plurality of open troughlike molding recesses sunk therein and spaced along the length of the surface portions of said die wires in which they are sunk; each of said molding recesses including an elongated portion which extends generally downwardly in a side surface portion of a die wire, and each of said recesses having an open end which opens into the bottom surface of the particular die wire in which each such recess is sunk; means for driving all of said die wires at a predetermined linear speed lengthwise through endless paths; means for guiding all of said die wires into a portion of said paths wherein said die wires lie in spaced array; a support plate having a lower surface and having a smooth continuous upper surface engaging all of the bottom surfaces of said die wires in said portion of said paths to support said die wires against downward movement; and extruder nozzle having a narrow slitlike orifice extending transversely of said portion of the paths of said die wires entirely across the width of said spaced array of die wires, said orifice being defined by a transversely extending upstream wall defining the edge of said orifice which is upstream thereof relative to the paths of movement of said die wires in said spaced array, a transversely extending downstream wall and spaced sidewalls which close the ends of said orifice; said upstream wall having a lower edge in which there is formed a plurality of spaced notchlike upstream openings equal in number to the number of said die wires, each of said upstream openings extending through said upstream wall in the direction of travel of said die wires to permit the passage of one of said die wires therethrough to enter and move through said orifice, each of said upstream openings having a contour such as to conform with an accurate sliding fit to said side and top surface portions of the die wire passing therethrough; said downstream wall having a lower edge in which there is formed a plurality of spaced notchlike downstream openings equal in number to the number of said die wires, each of said downstream openings extending through said downstream wall in the direction of travel of said die wires to permit the passage of one of said die wires therethrough to leave said orifice, each of said downstream openings having a contour such as to conform with an accurate sliding fit to said side and top surface portions of the die wire passing therethrough; the portions of the lower edge of each of said upstream and downstream walls which lie between the spaced notchlike openings formed therein constituting substantially smooth continuations of the generally planar bottom surfaces of all of the die wires passing respectively through said upstream and downstream walls when said extruder nozzle is pressed downwardly upon said die wires in said portion of said paths; means for supplying a liquid moldable plastic material under pressure to the interior of said nozzle to deposit said plastic material upon said die wires and in the molding recesses sunk therein as they pass through said nozzle; said support plate having a downstream terminal edge extending transversely of said portion of said paths and lying beneath said upstream wall; a movable support means having a surface spaced below the level of the bottom surfaces of all of those portions of said die wires which are passing through said orifice; means for driving said movable support means to move said surface thereof at a speed which is equal to the predetermined linear speed of said die wires; said stationary supporting means having a generally vertically disposed downstream end wall extending transversely throughout the width of and located beneath said upstream wall of said nozzle; sealing means between said surface of said movable support means and said vertically disposed end wall of said stationary supporting means thereby to provide a chamber positioned below said bottom surfaces of said die wires, above said surface of said movable support means and downstream of said end wall of said stationary supporting means, into which chamber said liquid plastic material will flow from said orifice downwardly through the spaces between said die wires which are passing through said orifice, and from which chamber said liquid plastic material is prevented by said sealing means from leaking in an upstream direction; said chamber having an extruding outlet defined at the top by the bottom surfaces of the portions of all of said die wires which are passing through said downstream wall of said nozzle and the continuations of said bottom surfaces afforded by said portions of said lower edge of said downstream wall which lie between said spaced array of die wires, and said extruding outlet being defined at the bottom by said surface of said movable support means, said extruding outlet extending transversely throughout the width of said spaced array of die wires and being closed at the transverse ends whereby said liquid plastic material is free to flow only downstream from said extruding outlet; the plastic material flowing from said outlet and the die wires leaving said nozzle moving together with said surface of said movable support means with the plastic material scraped off said side and top surfaces of said die wires by said downstream openings but remaining deposited in said molding recesses; the plastic material remaining in each of said recesses being integrally joined through said open end of the recess in which it remains with the plastic material flowing from said outlet; and means for solidifying the plastic material remaining in said molding recesses and the plastic material flowing form said outlet as an integral structure.

7. In a machine for manufacturing a continuous web comprising a flexible base sheet made at least in part from a moldable plastic material and having pilelike protuberances made from and integral with the plastic material of said base sheet, the combination of a plurality of die wires each comprising an endless loop of metal wire having a predetermined cross-sectional contour defining exterior surfaces of said die wire including side and top surface portions and a generally planar bottom surface, at least some of the side surface portions of said die wires having a plurality of open troughlike molding recesses sunk therein and spaced along the length of the surface portions of said die wires in which they are sunk; each of said molding recesses including an elongated portion which extends generally downwardly in a side surface portion of a die wire, and each of said recesses having an open end which opens into the bottom surface of the particular die wire in which each such recess is sunk; means for driving all of said die wires at a predetermined linear speed lengthwise through endless paths; means for guiding all of said die wires into a portion of said paths wherein said die wires lie in spaced array; a support plate having a lower surface and having a smooth continuous upper surface engaging all of the bottom surfaces of said die wires in said portion of said paths to support said die wires against downward movement; an extruder nozzle having a narrow slitlike orifice extending transversely of said portion of the paths of said die wires entirely across the width of said spaced array of die wires, said orifice being defined by a transversely extending upstream wall defining the edge of said orifice which is upstream thereof relative to the paths of movement of said die wires in said spaced array, a transversely extending downstream wall and spaced sidewalls which close the ends of said orifice; said upstream wall having a lower edge in which there is formed a plurality of spaced notchlike upstream openings equal in number to the number of said die wires, each of said upstream openings extending through said upstream wall in the direction of travel of said die wires to permit the passage of one of said die wires therethrough to enter and move through said orifice, each of said upstream openings having a contour such as to conform with an accurate sliding fit to said side and top surface portions of the die wire passing therethrough; said downstream wall having a lower edge in which there is formed a plurality of spaced notchlike downstream openings equal in number to the number of said die wires, each of said downstream openings extending through said downstream wall in the direction of travel of said die wires to permit the passage of one of said die wires therethrough to leave said orifice, each of said downstream openings having a contour such as to conform with an accurate sliding fit to said side and top surface portions of the die wire passing therethrough; the portions of the lower edge of each said upstream and downstream walls which lie between the spaced notchlike openings formed therein constituting substantially smooth continuations of the generally planar bottom surfaces of all of the die wires passing respectively through said upstream and downstream walls when said extruder nozzle is pressed downwardly upon said die wires in said portion of said paths; means for supplying a liquid moldable plastic material under pressure to the interior of said nozzle to deposit said plastic material upon said die wires and in the molding recesses sunk therein as they pass through said nozzle; said support plate having a downstream terminal edge extending transversely of said portion of said paths and lying beneath said upstream wall; a drum having a cylindrical surface and rotatable about an axis extending transversely of said portion of said paths; means for rotating said drum to move the surface thereof at a peripheral speed equal to the linear speed of travel of said die wires; means for feeding a continuous web of porous flexible sheet material lengthwise into contact with said cylindrical surface of said drum at a point beneath said support plate, said drum and said support plate being so positioned with respect to one another that said web moving with and in contact with said cylindrical surface of said drum comes into contact with said lower surface of said support plate and is moved in frictional contact therewith to emerge from beneath said downstream terminal edge of said support plate into the liquid plastic material within said nozzle at a level beneath the bottom surfaces of said die wires whereby said web of porous sheet material is impregnated by said liquid plastic material and thereafter rises with the curvature of said cylindrical surface of said drum into contact with the bottom surfaces of all of said die wires and with said lower edge surfaces of said downstream wall; the impregnated web and said die wires thereafter emerging from said downstream lip with said liquid plastic material scraped off said side and top surfaces of said die wires by said downstream openings but remaining deposited in said molding recesses and with said liquid plastic scraped off the portions of the upper surface of said web of porous material lying between said die wires by said lower edge surfaces of said downstream wall but remaining in the pores of said web; the plastic material remaining in each of said recesses being integrally joined through said open end of the molding recess in which it remains with the plastic material remaining in said pores; and means for solidifying the plastic material remaining in said recesses and pores as an integral structure.

8. In a machine for manufacturing a continuous web comprising a flexible base sheet made at least in part from a moldable plastic material and having pilelike protuberances made from and integral with the plastic material of said base sheet, the combination of a plurality of die wires each comprising an endless loop of metal wire having a predetermined cross-sectional contour defining exterior surfaces of said die wire including side and top surface portions and a generally planar bottom surface, at least some of the side surface portions of said die wires having a plurality of open troughlike molding recesses sunk therein and spaced along the length of the surface portions of said die wires in which they are sunk; each of said molding recesses including an elongated portion which extends generally downwardly in a side surface portion of a die wire, and each of said recesses having an open end which opens into the bottom surface of the particular die wire in which each such recess is sunk; means for driving all of said die wires at a predetermined linear speed lengthwise through endless paths; means for guiding all of said die wires into a portion of said paths wherein said die wires lie in spaced array; a support plate having a lower surface and having a smooth continuous upper surface engaging all of the bottom surfaces of said die wires in said portion of said paths to support said die wires against downward movement; an extruder nozzle having a narrow slitlike orifice extending transversely of said portion of the paths of said die wires entirely across the width of said spaced array of die wires, said orifice being defined by a transversely extending upstream wall defining the edge of said orifice which is upstream thereof relative to the paths of movement of said die wires in said spaced array, a transversely extending downstream wall and spaced parallel sidewalls which close the ends of said orifice; said upstream wall having a lower edge in which there is formed a plurality of spaced notchlike upstream openings equal in number to the number of said die wires, each of said upstream openings extending through said upstream wall in the direction of travel of said die wires to permit the passage of one of said die wires therethrough to enter and move through said orifice, each of said upstream openings having a contour such as to conform with an accurate sliding fit to said side and top surface portions of the die wire passing therethrough; said downstream wall having a lower edge in which there is formed a plurality of spaced notchlike downstream openings equal in number to the number of said die wires, each of said downstream openings extending through said downstream wall in the direction of travel of said die wires to permit the passage of one of said die wires therethrough to leave said orifice, each of said downstream openings having a contour such as to conform with an accurate sliding fit to said side and top surface portions of the die wire passing therethrough; the portions of the lower edge of each said upstream and downstream walls which lie between the spaced notchlike openings formed therein constituting substantially smooth continuations of the generally planar bottom surfaces of all of the die wires passing respectively through said upstream and downstream walls when said extruder nozzle is pressed downwardly upon said die wires in said portion of said paths; means for supplying a liquid moldable plastic material under pressure to the interior of said nozzle to deposit said plastic material upon said die wires and in the molding recesses sunk therein as they pass through said nozzle; said support plate having a downstream terminal edge extending transversely of said portion of said paths and lying beneath said upstream wall; a drum having a cylindrical surface and rotatable about an axis extending transversely of said portion of said path; means for rotating said drum to move the surface thereof at a peripheral speed equal to the linear speed of travel of said die wires; first gasket means fixed with respect to said support plate and extending throughout the width of said support plate in contact with said lower surface of said support plate adjacent said terminal edge, said drum and said support plate being so positioned with respect to one another that said first gasket means lies in frictional sliding contact with said cylindrical surface of said drum to prevent leakage of said liquid plastic material between said lower surface of said support plate and said surface of said drum beneath said downstream terminal edge of said support plate, second gasket means fixed with respect to said support plate and positioned beneath said spaced parallel sidewalls and lying in frictional sliding contact with said surface of said drum to prevent leakage of said liquid plastic material between said sidewalls and said surface of said drum; said cylindrical surface of said drum rising into predetermined proximity with the bottom surfaces of all of said die wires and with said lower edge surfaces of said downstream wall to define an extruding outlet of predetermined thickness extending transversely of and beneath said wires and said downstream wall through which said liquid plastic material is extruded as a continuous film; said plastic material being scraped off said side and top surfaces of said die wires by said downstream openings but remaining deposited in said molding recesses as said wires pass through said downstream wall; the plastic material remaining in each of said recesses being integrally joined through said open end of the recess in which it remains with said plastic material in said extruded continuous film; and means for solidifying said plastic material remaining in said molding recesses and in said continuous film of plastic material as an integral structure.

9. A machine in accordance with claim 6 in which there is provided a suction chamber upstream of said extruder nozzle for reducing the amount of air occluded upon all of said die wires and included in the molding recesses sunk in said die wires as said die wires enter said upstream openings in said upstream wall of said nozzle.

10. A machine in accordance with claim 6 specifically designed for the manufacture of a continuous web of flexible base sheet material having a pile comprising molded plastic hooks standing generally vertically from said base sheet and having free ends turned back toward said base sheet, in which at least some of said die wires have a cross-sectional contour which includes a generally semicircular portion defining curved top surface portions of said die wires, and in which at least some of said molding recesses sunk in those of said die wires having said curved top surface portions are provided with continuations of those troughlike portions which extend downwardly in side surface portions of said die wires, said continuations comprising troughlike portions which extend over said curved top surface portions of said die wires and terminate in closed ends above the level of the bottom surface of the die wires in which said continuations are sunk.

11. In apparatus for the manufacture of pilelike elements in the form of hooks each having a generally vertically extending leg portion and a portion having a free end, the combination of a die wire in the form of an endless loop, means for driving said die wire lengthwise in an endless path, said die wire having a cross section such as to define surface portions of said die wire including a generally vertically extending sidewall surface and a top surface, a plurality of elongated troughlike molding recesses spaced lengthwise of said die wire, each of said recesses being sunk in said sidewall surface and having a portion extending lengthwise generally vertically throughout the height of said sidewall surface, and each of said molding recesses continuing over said top surface and terminating in a closed end located at a level above the lowermost portions of said generally vertically extending portion of said molding recess, means located in said endless path for applying a moldable liquid plastic material to said surface of said die wire and for filling said molding recesses with said liquid plastic material, means comprising a wall having an opening therein through which said die wire is moved after said application of and filling of said molding recesses with said liquid plastic material, said opening having a contour such as to form an accurate sliding fit with the surfaces of said die wire in which said molding recesses are sunk, whereby as said die wire is moved through said opening the liquid plastic material is scraped off said surfaces thereof in which said molding recesses are sunk while leaving said liquid plastic material in said molding recesses, and means for solidifying said plastic material remaining in said recesses.

UNITED STATES PATENT OFFICE
CERTIFICATE OF CORRECTION

Patent No. 3,594,865          Dated July 27, 1971

Inventor(s) George H. Erb

It is certified that error appears in the above-identified patent and that said Letters Patent are hereby corrected as shown below:

| | |
|---|---|
| Col. 11, line 6<br>Claim 1 | before said, second occurrence, insert --entirely across the width of said spaced array of die wires,-- |
| Col. 11, line 52<br>Claim 3 | "said" should be --side-- |
| Col. 16, line 46<br>Claim 8 | "path" should be --paths-- |
| Col. 17, line 25<br>Claim 10 | "surface" should be --surfaces-- |
| Col. 18, line 15<br>Claim 11 | "moldable liquid" should be --liquid moldable-- |
| Col. 18, line 15<br>Claim 11 | "surface" should be --surfaces-- |

Signed and sealed this 29th day of February 1972.

(SEAL)
Attest:

EDWARD M. FLETCHER, JR.
Attesting Officer

ROBERT GOTTSCHALK
Commissioner of Patents